United States Patent
Mattes et al.

(10) Patent No.: US 10,552,697 B2
(45) Date of Patent: Feb. 4, 2020

(54) SYSTEMS, DEVICES, AND METHODS FOR IDENTIFYING USER DATA

(71) Applicant: Jumio Corporation, Palo Alto, CA (US)

(72) Inventors: Daniel Mattes, Wels (AU); Chad Starkey, Los Altos, CA (US)

(73) Assignee: Jumio Corporation, Palo Alto, CA (US)

( * ) Notice: Subject to any disclaimer, the term of this patent is extended or adjusted under 35 U.S.C. 154(b) by 107 days.

(21) Appl. No.: 15/432,831

(22) Filed: Feb. 14, 2017

(65) Prior Publication Data

US 2018/0234420 A1 Aug. 16, 2018

Related U.S. Application Data

(63) Continuation of application No. 13/755,622, filed on Jan. 31, 2013, now abandoned.

(Continued)

(51) Int. Cl.
*H04L 29/06* (2006.01)
*G06K 9/00* (2006.01)
*G06Q 20/40* (2012.01)

(52) U.S. Cl.
CPC ... *G06K 9/00892* (2013.01); *G06Q 20/40145* (2013.01); *H04L 63/0861* (2013.01);
(Continued)

(58) Field of Classification Search
CPC ............... H04L 63/0884; H04L 63/101; H04L 63/0861; H04L 63/083; H04L 63/107;
(Continued)

(56) References Cited

U.S. PATENT DOCUMENTS 6,128,398 A 10/2000 Kuperstein et al.
6,201,548 B1 3/2001 Cariffe et al.
(Continued)

FOREIGN PATENT DOCUMENTS

CN 101022489 A 8/2007
KR 2002-0011052 A 2/2002
(Continued)

OTHER PUBLICATIONS

Abulafia, Office Action, U.S. Appl. No. 12/502,269, dated Apr. 20, 2015, 23 pgs.
(Continued)

*Primary Examiner* — Abu S Sholeman
(74) *Attorney, Agent, or Firm* — Morgan, Lewis & Bockius LLP

(57) ABSTRACT

The various embodiments described herein include methods, devices, and systems for identifying users. In one aspect, a method includes (1) receiving from a server a request to identify a user; (2) in response to the identification request, sending a request for encoded image data corresponding to one or more features of the first user, the request specifying a particular encoding for the image data; (3) receiving encoded image data corresponding to the one or more features of the first user; (4) obtaining stored image data for an authorized user corresponding to one or more features of the authorized user; (5) determining whether the first user is the authorized user based on a comparison of the received encoded image data and the stored image data; and (6) providing to the remote server an identification indicator based on the determination of whether the first user is the authorized user.

18 Claims, 9 Drawing Sheets

Related U.S. Application Data

(60) Provisional application No. 61/594,973, filed on Feb. 3, 2012.

(52) U.S. Cl.
CPC .......... *H04L 63/107* (2013.01); *H04L 63/083* (2013.01); *H04L 2463/102* (2013.01); *H04L 2463/121* (2013.01)

(58) Field of Classification Search
CPC ........ H04L 2463/121; H04L 2463/102; G06K 9/00892; G06Q 20/40145
USPC ........................................... 726/1, 7, 23, 24
See application file for complete search history.

(56) References Cited

U.S. PATENT DOCUMENTS

| | | | |
|---|---|---|---|
| 6,873,715 | B2 | 3/2005 | Kuo et al. |
| 7,118,032 | B2 | 10/2006 | Elliot et al. |
| 7,143,942 | B2 | 12/2006 | Yamanaka et al. |
| 7,653,183 | B2 | 1/2010 | Patel et al. |
| 7,802,720 | B2 | 9/2010 | Yang |
| 8,577,810 | B1 | 11/2013 | Dalit et al. |
| 8,995,774 | B1 | 3/2015 | van Deventer et al. |
| 8,997,195 | B1 * | 3/2015 | Fadida .................. H04L 63/083 705/2 |
| 9,225,700 | B1 * | 12/2015 | Dotan ..................... H04L 63/08 |
| 9,305,230 | B2 | 4/2016 | Abulafia et al. |
| 9,760,788 | B2 | 9/2017 | Shustorovich et al. |
| 9,996,684 | B2 * | 6/2018 | Hoyos ..................... H04L 63/10 |
| 10,176,371 | B2 | 1/2019 | Mattes |
| 2002/0065728 | A1 | 5/2002 | Ogasawara |
| 2003/0173401 | A1 | 9/2003 | Yamagami |
| 2004/0107170 | A1 | 6/2004 | Labrou et al. |
| 2005/0009564 | A1 | 1/2005 | Hayaashi et al. |
| 2005/0093999 | A1 | 5/2005 | Yamaya |
| 2005/0247797 | A1 | 11/2005 | Ramachandran |
| 2006/0129485 | A1 * | 6/2006 | Hamzy ................ G06Q 20/102 705/40 |
| 2006/0144925 | A1 | 7/2006 | Jones |
| 2006/0237530 | A1 | 10/2006 | Elliot et al. |
| 2007/0036398 | A1 | 2/2007 | Chen |
| 2007/0156592 | A1 | 7/2007 | Henderson |
| 2008/0040278 | A1 | 2/2008 | DeWitt |
| 2008/0298588 | A1 | 12/2008 | Shakkarwar |
| 2009/0110279 | A1 | 4/2009 | Jain et al. |
| 2009/0173784 | A1 | 7/2009 | Yang |
| 2009/0234773 | A1 | 9/2009 | Hasson |
| 2009/0309698 | A1 * | 12/2009 | Headley ................ G06F 21/316 340/5.52 |
| 2009/0328166 | A1 | 12/2009 | Burch et al. |
| 2010/0008535 | A1 * | 1/2010 | Abulafia ............... G06K 9/2054 382/100 |
| 2010/0078472 | A1 | 4/2010 | Lin et al. |
| 2010/0171826 | A1 | 7/2010 | Hamilton et al. |
| 2011/0276484 | A1 * | 11/2011 | Pearson ................. G06Q 20/38 705/44 |
| 2011/0302645 | A1 * | 12/2011 | Headley ................ H04L 9/3215 726/7 |
| 2012/0167185 | A1 * | 6/2012 | Menezes ............... H04L 9/3213 726/5 |
| 2013/0051632 | A1 * | 2/2013 | Tsai ................... G06K 9/00892 382/118 |
| 2013/0204786 | A1 * | 8/2013 | Mattes ................ G06Q 20/4014 705/44 |
| 2014/0040989 | A1 * | 2/2014 | Davis ..................... H04L 63/08 726/4 |
| 2014/0052636 | A1 * | 2/2014 | Mattes ................. G06Q 20/409 705/44 |
| 2014/0115708 | A1 * | 4/2014 | Terwilliger ............. G06F 21/36 726/26 |
| 2015/0278593 | A1 | 10/2015 | Panferov et al. |
| 2016/0112645 | A1 | 4/2016 | Amtrup et al. |

FOREIGN PATENT DOCUMENTS

| | | |
|---|---|---|
| KR | 2004-0046555 A | 6/2004 |
| KR | 10-0724432 B1 | 5/2007 |
| WO | WO 2003/047208 A1 | 6/2003 |
| WO | WO 2005/066907 A1 | 7/2005 |

OTHER PUBLICATIONS

Abulafia, Final Rejection, U.S. Appl. No. 12/502,269, dated Jun. 22, 2012, 22 pgs.
Abulafia, Office Action, U.S. Appl. No. 12/502,269, dated Dec. 15, 2011, 16 pgs.
Abulafia, Notice of Allowance, U.S. Appl. No. 12/502,269, dated Oct. 9, 2015, 8 pgs.
Abulafia, Office Action, U.S. Appl. No. 13/275,203, dated Sep. 16, 2013, 13 pgs.
Abulafia, Final Rejection, U.S. Appl. No. 13/275,203, dated Apr. 1, 2014, 20 pgs.
Abulafia, Office Action, U.S. Appl. No. 13/275,203, dated Jul. 23, 2014, 22 pgs.
Abulafia, Final Rejection, U.S. Appl. No. 13/275,203, dated Jan. 7, 2015, 18 pgs.
Abulafia, Notice of Allowance, U.S. Appl. No. 13/275,203, dated Nov. 23, 2015, 11 pgs.
Abulafia, Office Action, U.S. Appl. No. 15/059,767, dated May 12, 2016, 16 pgs.
Abulafia, FinalOffice Action, U.S. Appl. No. 15/059,767, dated Nov. 23, 2016, 7 pgs.
Abulafia, Notice of Allowance, U.S. Appl. No. 15/059,767, dated Aug. 2, 2017, 11 pgs.
Mattes, Notice of Allowance, U.S. Appl. No. 15/014,690, dated Sep. 9, 2016, 9 pgs.
Mattes, Notice of Allowance, U.S. Appl. No. 15/014,690, dated Dec. 23, 2016, 6 pgs.
Mattes, Office Action, U.S. Appl. No. 13/750,969, dated May 6, 2016, 17 pgs.
Mattes, Final Office Action, U.S. Appl. No. 13/750,969, dated Jan. 12, 2017, 21 pgs.
Mattes, Office Action, U.S. Appl. No. 13/750,969, dated Apr. 13, 2015, 15 pgs.
Mattes, Office Action, U.S. Appl. No. 13/750,969, dated Aug. 26, 2015, 16 pgs.
Mattes, Office Action, U.S. Appl. No. 13/755,622, dated Mar. 4, 2015, 8 pgs.
Mattes, Final Office Action, U.S. Appl. No. 13/755,622, dated Oct. 16, 2015, 11 pgs.
Mattes, Office Action, U.S. Appl. No. 13/755,622, dated Jun. 10, 2016, 15 pgs.
Mattes, Final Office Action, U.S. Appl. No. 13/755,622, dated Dec. 13, 2016, 14 pgs.
Mattes, Notice of Allowance, U.S. Appl. No. 15/464,635, dated Sep. 26, 2018, 7 pgs.
Mattes, Office Action, U.S. Appl. No. 15/464,635, dated Jul. 19, 2018, 8 pgs.
Mattes, Office Action, U.S. Appl. No. 15/593,062, dated Aug. 10, 2018, 15 pgs.
Simon, Know the latest credit card fraud techniques, Nov. 2, 2006, 2 pgs.
Jumio, Communication Pursuant to Rules 161(1) and 162, EP16713053.3, Oct. 11, 2017, 2 pgs.
Abulafia, Office Action, U.S. Appl. No. 15/005,836, dated May 16, 2019, 9 pgs.
Mattes, Office Action, U.S. Appl. No. 16/195,652, dated Jun. 7, 2019, 11 pgs.
Abulafia, Notice of Allowance, U.S. Appl. No. 15/005,836, dated Oct. 16, 2019, 9 pgs.
Mattes, Notice of Allowance, U.S. Appl. No. 16/195,652, dated Sep. 30, 2019, 7 pgs.

* cited by examiner

SYSTEMS, DEVICES, AND METHODS FOR IDENTIFYING USER DATA

PRIORITY AND RELATED APPLICATIONS

This application is a continuation of U.S. application Ser. No. 13/755,622, filed Jan. 31, 2013, entitled "Verification of Online Transactions," which claims priority to U.S. Provisional Patent Application No. 61/594,973 filed on Feb. 3, 2012.

TECHNICAL FIELD

The present disclosure generally relates to identification of user data, including but not limited to, identifying image data of a user in accordance with an encoding indicator.

BACKGROUND

Online transactions have become a daily occurrence for many people and have also created opportunities for new online services and accounts. For example, it is now common for a consumer to browse online product and service offerings, select, place an order, and pay for a product and/or a service in a transaction that is substantially all online. However, online transactions may be vulnerable to security breaches and various forms of fraud.

In particular, one of the problems with a typical online transaction is that it circumvents signature and identification verification protocols that are available during an in-person transaction. For example, during a typical online transaction, a merchant provides an order form that requires a consumer to enter personal data such a name, a billing address, a telephone number, and credit card information. The consumer enters and sends the data requested by the form over the internet, and the merchant verifies that the credit card information is valid and that the card can be charged the payment amount. The card verification is usually conducted over a proprietary billing center verification network, such as the VisaNet network. However, the personal data and the credit card information provided by the consumer may have been acquired illicitly by the alleged consumer. Neither the merchant nor the billing center is able to reliably verify that the individual providing the personal data and credit card information is the true authorized user of the credit card.

By contrast, during an in-store transaction, a sales clerk can request a signed picture identification in order to verify that the person tendering the credit card is the true authorized user of the credit card. The sale clerk can then compare the signatures on the credit card and the sales slip against the signature on the picture identification, and also verify that the consumer is the same person shown on the picture identification. Moreover, the possibility that picture identification may be requested serves as a potential deterrent against using an illicitly acquired payment instrument during an in-store transaction.

Similarly, merchants and/or service providers offering age-restricted and/or region restricted products and/or services (e.g. alcohol and online gambling) have no way to reliably verify that a user is who he/she purports to be and/or is of the age he/she purports to be. Conventionally, a user simply enters a birth date into an online form. In turn, the online merchant and/or service provider merely checks that the birth date offered by the user indicates that the user is of age to receive and/or view the age-restricted products and/or services. The online merchant and/or service provider is unable to reliably verify that the user has provided his/her actual birth date or other personal data. In other words, the online merchant and/or service provider must trust the integrity of the user without being able to verify the data provided by the user.

SUMMARY

Systems, methods and devices described herein enable improved identity verification via encoding and transmission of specific visual and/or audio data. As such, after considering this discussion, and particularly after reading the section entitled "Detailed Description" one will understand how the features of various implementations are used to, for example, enable identity verification of account holders of credit card, debit cards, and other payment instruments during online transactions. For example, in some implementations, systems, methods and devices are operable to compare one or more encoded and/or encrypted images of facial features obtained upon activation of the payment instrument or security measures with one or more encoded and/or encrypted images of facial features obtained during a subsequent online transaction to verify that the individual offering the payment instrument as a form of payment is the true and authorized user of the payment instrument. Additionally and/or alternatively, a voice print record and/or location information may be combined with the use of the encoded and/or encrypted images to provide additional security. Additionally and/or alternatively, images of signatures, electronic signatures and/or other biometric information may be combined with the use of the encoded and/or encrypted images to provide additional security. Moreover, the possibility that an online consumer may be asked to provide a time-stamped facial image serves as a potential deterrent against using an illicitly acquired payment instrument for an online transaction, in a manner similar to the possibility that picture identification may be requested during an in-store transaction.

Some implementations include a computer-implemented method of verifying an online financial transaction. In some implementations, the verification method is performed at a device including a processor and memory storing programs for execution by the processor. In some implementations, the verification method includes receiving an image of an identification document; identifying one or more characteristics of the identification document from the received image; comparing the one or more identified characteristics to corresponding verified characteristics in order to determine whether there is a match based at least on one or more matching rules; and providing an authorization indicator in response to the determination.

In some implementations the authorization indicator indicates that the online transaction or service cannot be authorized in response to determining that there is no match; and the authorization indicator indicates that the online transaction or service is authorized in response to determining that there is a match.

In some implementations, the verification method also includes initiating a remedial process in response to determining that there is no match.

In some implementations, the verification method also includes receiving a service request; and transmitting a request for an image of an identification document in response to receiving the transaction request. In some implementations, the transaction request is received from a merchant application server.

In some implementations, the verification method also includes checking the timestamp of the received image. In some implementations, the verification method also includes checking location information associated with the received image.

In some implementations, the verification method also includes applying an optical character recognition technique to the received image; identifying a name and age data from the image after applying the optical character recognition technique; and verifying at least one of the age data or the name based on one or more additional sources of information. In some implementations, the one or more sources of information include an image of a payment instrument.

Some implementations include a verification server system to verify an online financial transaction. In some implementations, the verification server system includes a processor and a memory including executable instructions that enable the verification server system to verify online financial transactions. More specifically, in some implementations, the instructions when executed by the processor cause the verification server system to receive an image of an identification document; identify one or more characteristics of the identification document from the received image; compare the one or more identified characteristics to corresponding verified characteristics in order to determine whether there is a match based at least on one or more matching rules; and provide an authorization indicator in response to the determination.

Some implementations include a verification server system to verify an online financial transaction. In some implementations, the verification server system includes means for receiving an image of an identification document; means for identifying one or more characteristics of the identification document from the received image; means for comparing the one or more identified characteristics to corresponding verified characteristics in order to determine whether there is a match based at least on one or more matching rules; and means for providing an authorization indicator in response to the determination.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, illustrate only some example features of the present disclosure and are therefore not to be considered limiting, for the description may admit to other effective features.

Figure 1:
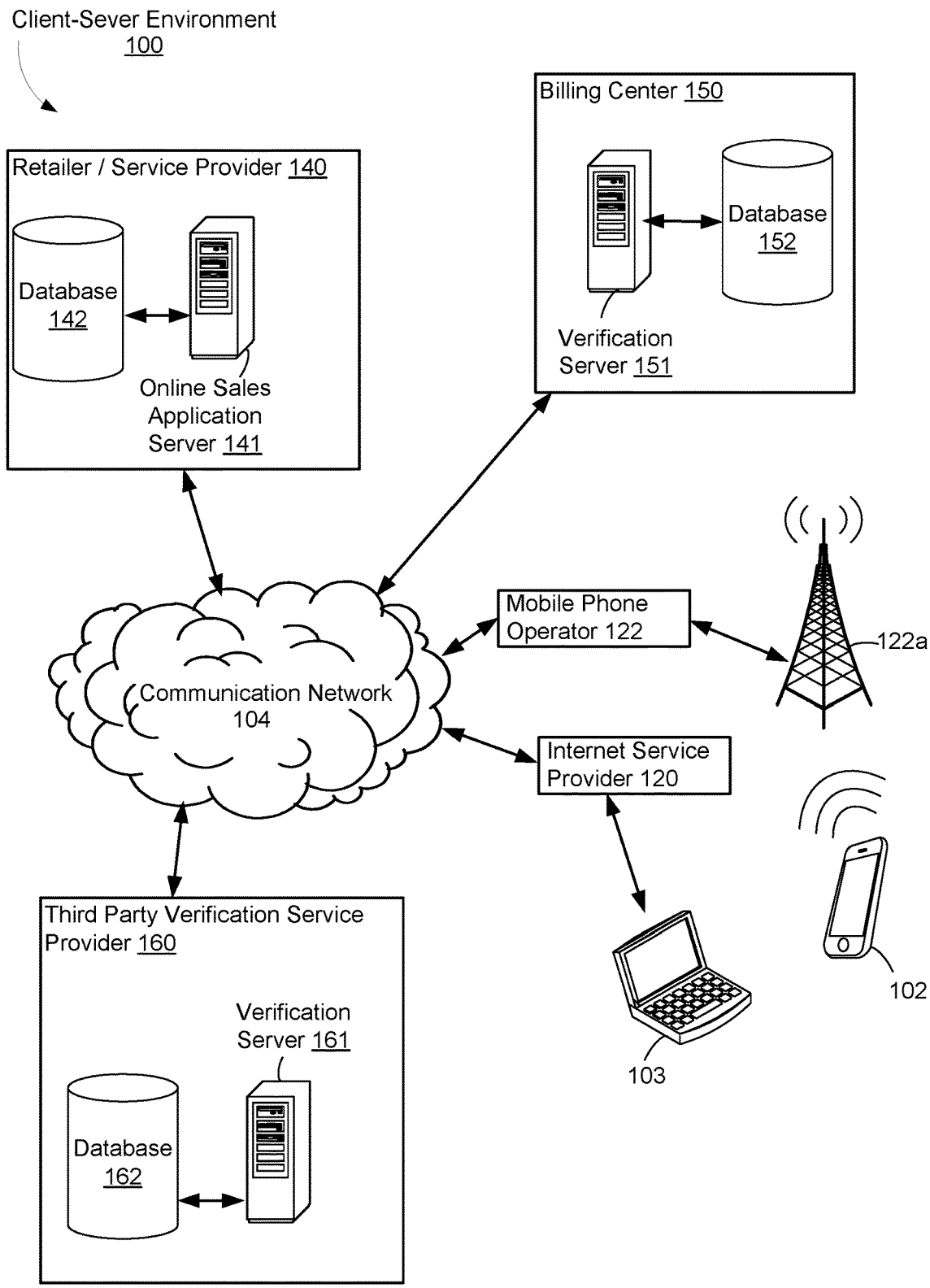
FIG. 1 is a block diagram of an example client-server environment.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described herein in order to provide a thorough understanding of the example implementations illustrated in the accompanying drawings. However, the invention may be practiced without these specific details. And, well-known methods, procedures, components, and circuits have not been described in exhaustive detail so as not to unnecessarily obscure more pertinent aspects of the example implementations.

FIG. 1 is a block diagram of an example client-server environment 100. While certain specific features are illustrated, those skilled in the art will appreciate from the present disclosure that various other features have not been illustrated for the sake of brevity and so as not to obscure more pertinent aspects of the implementations disclosed herein. To that end, the client-server environment 100 includes a billing center 150, a retailer/merchant (or service provider) 140, a third party verification service provider 160, a mobile phone operator 122 (i.e. wireless carrier), an internet service provider 120, and a communications network 104. Each of the billing center 150, the retailer 140, the third party verification service provider 160, the mobile phone operator 122, the internet service provider 120 are capable of being connected to the communication network 104 in order to exchange information with one another and/or other devices and systems. Additionally, the mobile phone operator 122 and the internet service provider 120 are operable to connect client devices to the communication network 104 as well. For example, a smartphone 102 is operable with the network of the mobile phone operator 122, which includes for example, a base station 122a. Similarly, for example, a laptop computer 103 (or tablet, desktop, workstation or the like) is connectable to the network provided by the internet service provider 120, which is ultimately connectable to the communication network 104. Moreover, while FIG. 1 only includes one of each of the aforementioned devices and systems, those skilled in the art will appreciate from the present disclosure that any number of such devices and/or systems may be provided in a client-server environment, and particular devices may be altogether absent. In other words, the client-server environment 100 is merely an example provided to discuss more pertinent features of the present disclosure.

The communication network 104 may be any combination of wired and wireless local area network (LAN) and/or wide area network (WAN), such as an intranet, an extranet, including a portion of the internet. It is sufficient that the communication network 104 provides communication capability between client devices and servers. In some implementations, the communication network 104 uses the HyperText Transport Protocol (HTTP) to transport information using the Transmission Control Protocol/Internet Protocol (TCP/IP). HTTP permits a client device to access various resources available via the communication network 104. However, the various implementations described herein are not limited to the use of any particular protocol.

The retailer 140, for example, includes an online customer sales application server 141 and a database 142. In some implementations, the retailer 140 includes a local customer sales application, such as a point-of-sale terminal within a department store. The retailer 140 may be an online service provider (e.g. a gambling website, a social networking website, a dating website, etc.) or a retailer of real and/or digital goods (e.g. clothing, music, etc.).

In some embodiments, the billing center 150 is associated with at least one credit company associated with a credit card, a debit card or other payment instrument. The billing center 150 may be a computerized system holding information relating to client accounts, billing conditions and history, transactions history, and personal and other details of each of clients and of each credit card associated with the billing center 150. To that end the billing center 150 includes a verification server 151 and a database 152. The billing center 150 may be associated with one or more credit companies, enabling the retrieval of data from one or more third party databases (not shown) including such information. As described in greater detail below with reference to FIG. 5, in order to execute and/or authorize transactions, the verification server 151 retrieves data from the database 152 to check authorization of a transaction according to pre-defined authorization rules followed by the billing center 151.

In some embodiments, the third party verification service provider 160 is configured to operate as a supplemental verification service provided in addition to any verification processes carried out by the billing center 150. To that end, the third party verification service provider 160 includes a verification server 161 and a database 162.

As discussed below in greater detail with reference to FIG. 2, client devices, such as the computer 103 and smartphone 102, include a display and a digital camera. A mobile application is operated at least in part by the client device. In some embodiments, the client devices 102 and 103 are enabled to communicate with the billing center 150, the third party verification service provider 160, and the retailer 140. For example, the computer may include at least one of an Ethernet enabled network adapter or interface, a WiFi enabled network adapter or interface, cable modem, DSL modem, a cellular wireless device, or the like.

In operation, a user may use a client device 102/103 to access the online customer sales application server 141 provided by the retailer 140. In order to make a purchase through the online customer sales application, the camera associated with the client device is used to obtain at least one image of the credit card and a picture of the user offering the credit card for payment purposes, which is processed according to one of the various methods described below.

Figure 2:
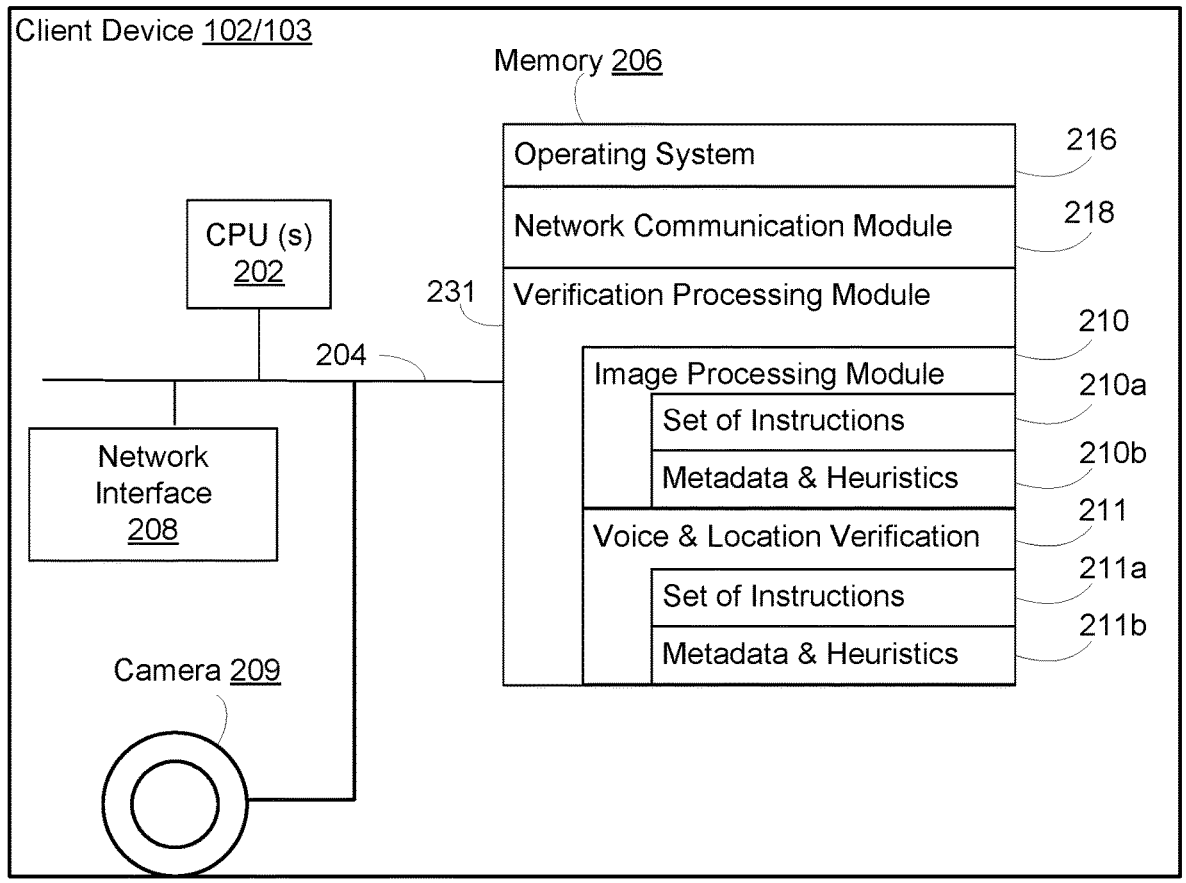
FIG. 2 is a block diagram of an example implementation of a client system.
Figure 2:
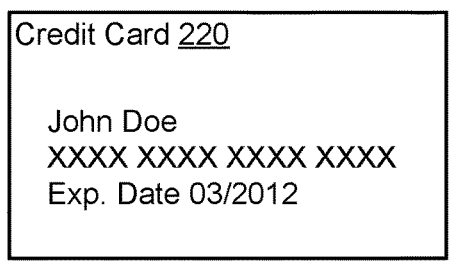
Figure 2:
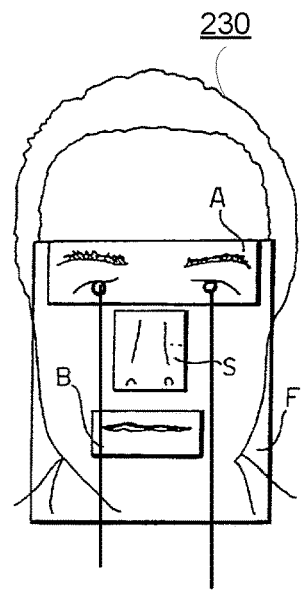

FIG. 2 is a block diagram of an example implementation of a client device (e.g. smartphone 102 or laptop 103) discussed above with reference to FIG. 1. While certain specific features are illustrated, those skilled in the art will appreciate from the present disclosure that various other features have not been illustrated for the sake of brevity and so as not to obscure more pertinent aspects of the implementations disclosed herein. To that end, the client device 102/103 includes one or more processing units (CPU's) 202, one or more network or other communications interfaces 208, memory 206, a digital camera 209, and one or more communication buses 204 for interconnecting these and various other components. The communication buses 204 may include circuitry (sometimes called a chipset) that interconnects and controls communications between system components. The memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 206 may optionally include one or more storage devices remotely located from the CPU(s) 202. The memory 206, including the non-volatile and volatile memory device(s) within the memory 206, comprises a non-transitory computer readable storage medium.

In some implementations, the memory 206 or the non-transitory computer readable storage medium of the memory 206 stores the following programs, modules and data structures, or a subset thereof including an operating system 216, a network communication module 218, and a verification processing module 231.

The operating system 216 includes procedures for handling various basic system services and for performing hardware dependent tasks.

The network communication module 218 facilitates communication with other devices via the one or more communication network interfaces 208 (wired or wireless) and one or more communication networks, such as the internet, other wide area networks, local area networks, metropolitan area networks, and so on.

The verification processing module 231 is configured to cooperate with instructions sent from a verification server (e.g. verification server 151), as discussed below with reference to FIG. 6. To that end, the verification processing module 231 includes an image processing module 210 and an optional voice and location data verification module 211. The image processing module 210 facilitates the capture and encoding of image data requested by the verification server. To that end, the image processing module 210 includes a set of instructions 210a and heuristics and metadata 210b. Similarly, the voice and location data verification module 211 facilitates the capture and encoding of voice and location data requested by the verification server. To that end, the voice and location data verification module 211 includes a set of instructions 211a and heuristics and metadata 211b.

FIG. 2 also shows, for example, a schematic image of a credit card 220 and a facial image of a user 230. The facial image 230 includes multiple windows isolating specific portions of the facial image that may be encoded and/or encrypted individually or in combination with one another. For example, the facial image 230 includes a first window F, which includes substantially all of the facial features of a user. In other examples, windows A, B and S are used to isolate the eyes, mouth and nose areas, respectively.

Figure 3:
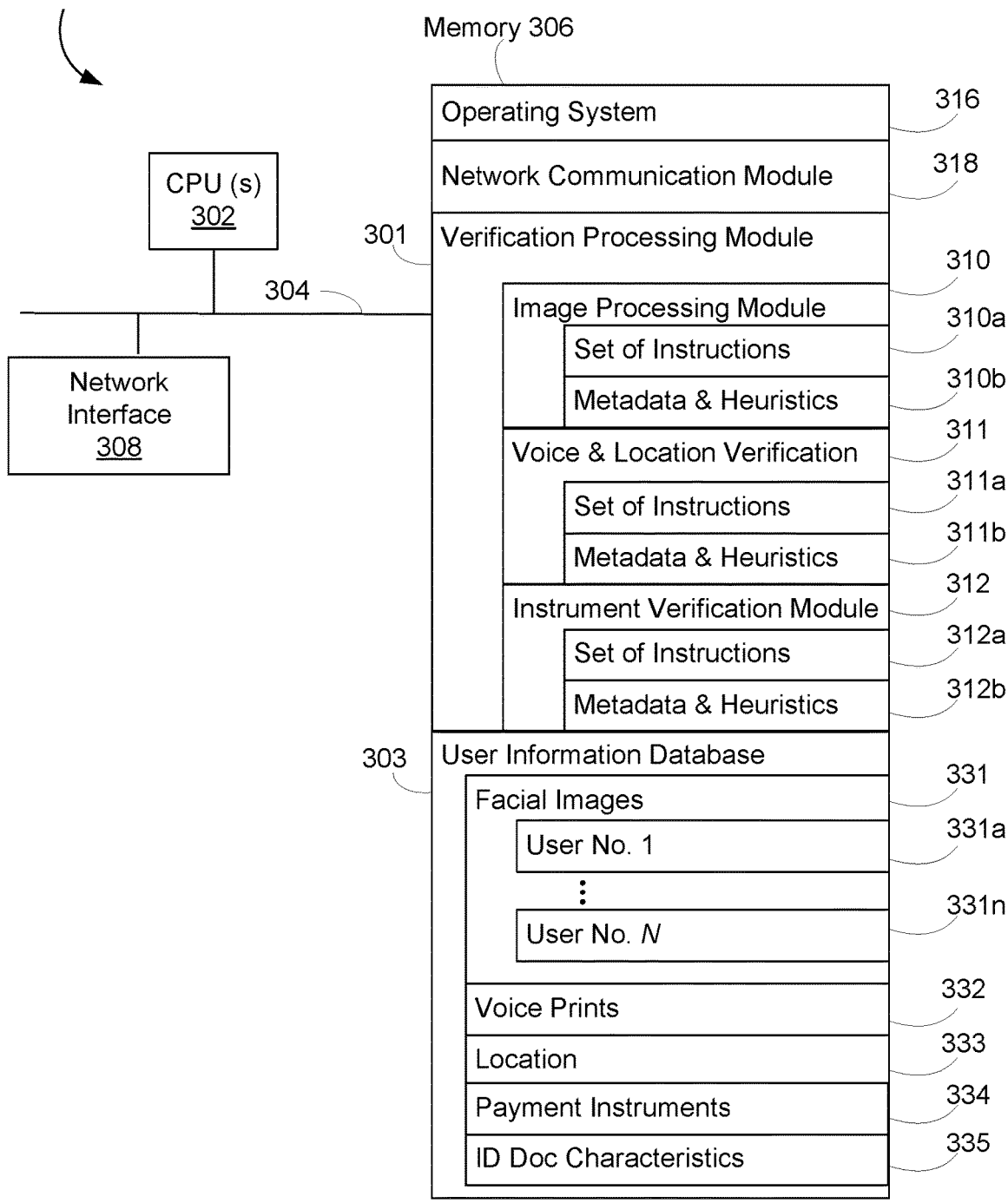
FIG. 3 is a block diagram of an example implementation of a server system.

FIG. 3 is a block diagram of an example implementation of a verification server system (e.g. verification server 161). While certain specific features are illustrated, those skilled in the art will appreciate from the present disclosure that various other features have not been illustrated for the sake of brevity and so as not to obscure more pertinent aspects of the implementations disclosed herein. To that end, the server system 151/161 includes one or more processing units (CPU's) 302, one or more network or other communications interfaces 308, memory 306, and one or more communication buses 304 for interconnecting these and various other components. The communication buses 304 may include circuitry (sometimes called a chipset) that interconnects and controls communications between system components. The memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 306 may optionally include one or more storage devices remotely located from the CPU(s) 302. The memory 306, including the non-volatile and volatile memory device(s) within the memory 306, comprises a non-transitory computer readable storage medium. In some implementations, the memory 306 or the non-transitory computer readable storage medium of the memory 306 stores the following programs, modules and data structures, or a subset thereof including an operating system 316, a network communication module 318, a verification processing module 301, and a user information database 303.

The operating system 316 includes procedures for handling various basic system services and for performing hardware dependent tasks.

The network communication module 318 facilitates communication with other devices via the one or more communication network interfaces 308 (wired or wireless) and one or more communication networks, such as the internet, other wide area networks, local area networks, metropolitan area networks, and so on. With further reference to FIG. 1, the network communication module 318 may be incorporated into the front end server 134.

The verification processing module 301 is configured to drive the verification process described herein, and described in greater detail with reference to FIGS. 4 and 5. To that end, the verification processing module 301 includes an image processing module 310, an optional voice and location data verification module 211, and an instrument verification module 312. The image processing module 310 directs the capture and encoding of image data. To that end, the image processing module 310 includes a set of instructions 310a, and heuristics and metadata 310b. Similarly, the voice and location data verification module 311 directs the capture and encoding of voice and location data. To that end, the voice and location data verification module 311 includes a set of instructions 311a and heuristics and metadata 311b. The instrument verification module 312 performs the verification process and handles the remedial measures necessary when a potential fraud is detected. To that end, the instrument verification module 312 includes a set of instructions 312a and heuristics and metadata 312b.

The user information database 303 includes user data such as facial image data 331, voice print data 332, location data 333, payment instruments 334, and verified identification document characteristics 335 associated with each user. In some implementations, the various types of data are indexed by known users and suspected defrauders. For example, the facial image data 331 includes data for a first user 331a and an $N^{th}$ user 331n.

Figure 4:
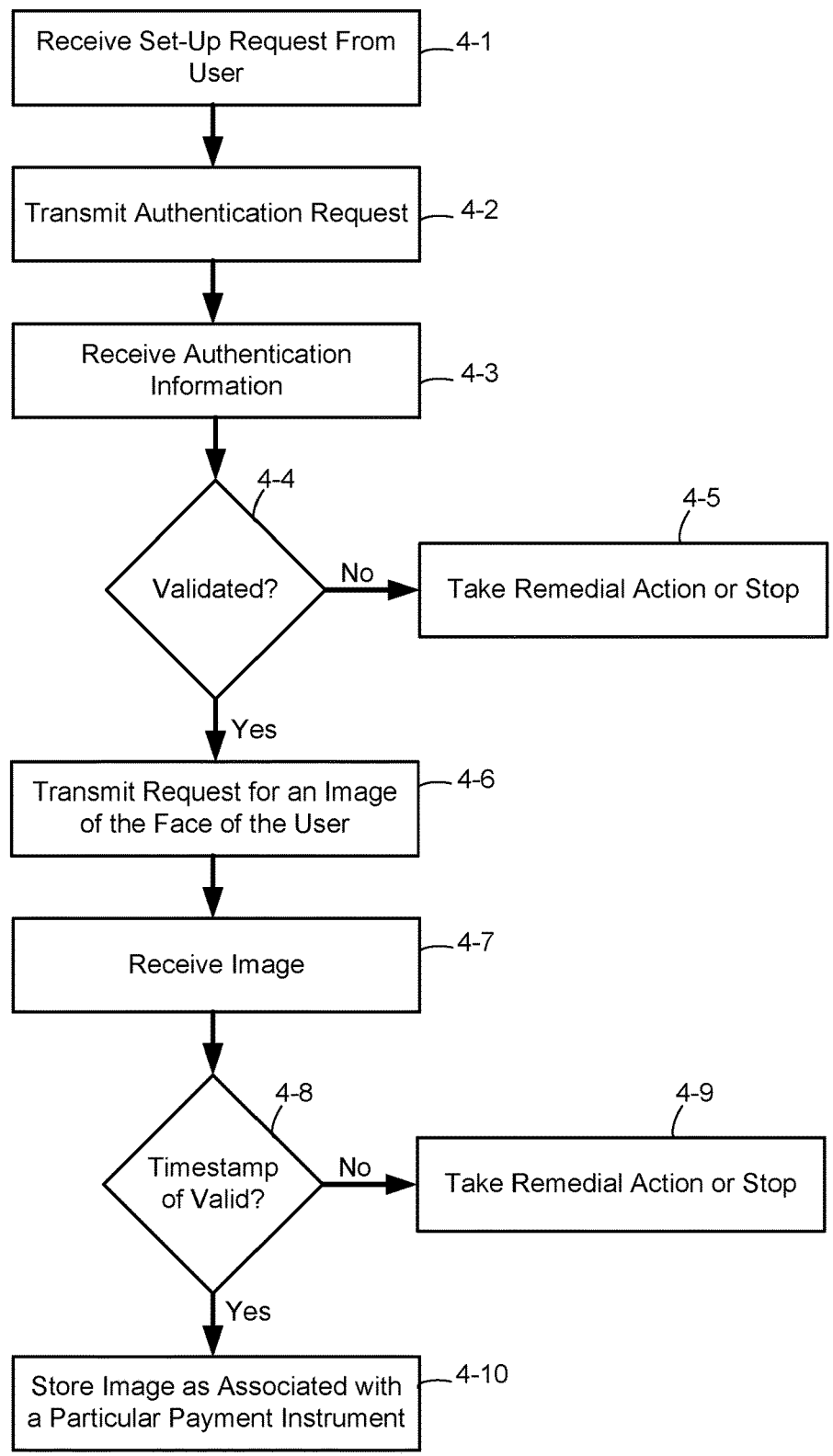
FIG. 4 is a flowchart representation of a server system method.

FIG. 4 is a flowchart representation of a server system method. In some implementations, the method is performed by a server system in order to collect personal data and enable authentication of subsequent online financial transactions. For example, with reference to FIG. 1, the method may be implemented on the verification servers 151 and/or 161 as a verification server software application. To that end, the method includes receiving a set-up request from a user via a client device (4-1). In some implementations, the set-up request is received when a payment instrument, such as a credit card or debit card, is activated by a user for the first time. Typically, credit cards and debit cards are sent to users in the mail. Upon receiving a credit card or debit card a user must call a billing center or the like to activate the card. During the activation process, the user can be routed to a secure website or call-center to register and/or activate the enhanced identity verification process described herein. Additionally and/or alternatively, in some implementations the enhanced identity verification process described herein may be delivered by a third party service, such as for example, the third party verification service provider 160 illustrated in FIG. 1. As such, the set-up request may be received after the payment instrument has been activated for the first time.

In response to receiving a set-up request, the method includes transmitting an authentication request to the client device (4-2). The authentication request indicates that the user must provide some form of authentication data that is likely only known to the user, such as a social security number (or the like), data of birth, a password, a street address, a previously provided verification code, a telephone number, the name/description of an image included in the request, answers to security questions, etc. Additionally and/or alternatively, the authentication request may also seek biometric information, such as a fingerprint scan or retina scan. Accordingly, the method includes receiving authentication information (4-3), and determining if the authentication information is correct or valid (4-4).

If the authentication information is not valid ("No" path from 4-4), the method includes taking remedial action or stopping the process altogether (4-5). For example, in some implementations a remedial action includes at least one of re-sending the original authentication request, sending a different authentication that includes a request for different or related authentication information, sending a message that indicates that the user should call a call-center representative, and automatically connected the user with a call-center representative. Additionally and/or alternatively, the process may stop in response to determining that the authentication information is not valid because the user has provided invalid authentication data more than a threshold number of times. Additionally and/or alternatively, the process may stop in response to determining that the authentication information is not valid because the current user is accessing the verification server from a device that is located in a geographic location that the actual user is unlikely to be. For example, location data can be determined by inspecting IP addresses or routing information received along with set-up request, or even embedded in an image when it was captured by a smartphone.

On the other hand, if the authentication information provided by the user via the client device is valid ("Yes" path from 4-4), the method includes transmitting a request for an image of the user to the client device (4-6), and subsequently receiving the requested image from the client device (4-7).

Digital pictures, especially those taken with digital cameras included in smartphones, often include a timestamp indicating when the picture was taken, and may also include the coordinates of the location where the picture was taken. As such, as an optional measure, the method includes determining if the timestamp of the received image is valid (4-8). In other words, the method includes inspecting the data field included in the received image file to determine whether or not the image was taken within a time period proximate to the current process (e.g. 1-2 minutes). If the timestamp is not valid ("No" path from 4-8), the method includes taking remedial action or stopping the process altogether (4-9). For example, in some implementations a remedial action includes at least one requesting another image at least one more time. Additionally and/or alternatively, the first rejected image and any subsequent images may be compared to determine if there are any abnormalities or other signs of fraud on the process.

On the other hand, if the timestamp is valid ("No" path from 4-8), the method includes storing the image as associated with a particular payment instrument (4-10). As discussed in greater detail below, the stored image can be used to create new user-specific authentication data on-the-fly during an online transaction process.

Figure 5:
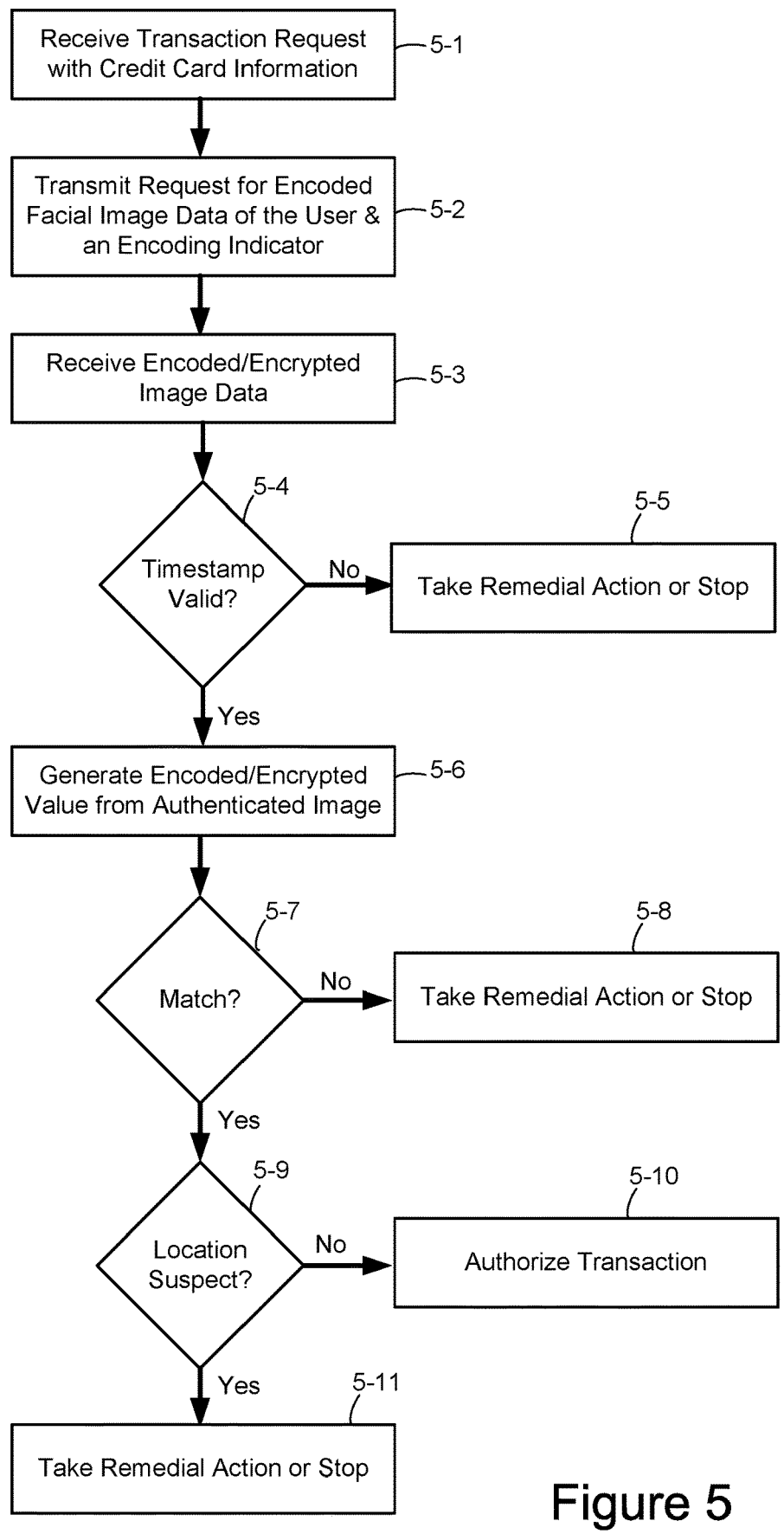
FIG. 5 is a flowchart representation of a server system method.

FIG. 5 is a flowchart representation of a server system method. In some implementations, the method is performed by a verification server system in order to enable authentication of an online financial transaction using previously stored image data of true authorized users. For example, with reference to FIG. 1, the method may be implemented on the verification servers 151 and/or 161 as a verification server software application. To that end, the method includes receiving a transaction request with credit card information (5-1). The transaction request may originate from an online order for the purchase of some product or service. For example, with reference to FIG. 1, a user via the client device 102, may have selected and offered to pay for a product offered by the retailer 140 using credit card information. In turn, the online sales application server 141 transmits the transaction request to one of the verification servers 151 or 161 depending on whether the verification process is supported by the billing center 150 or the third party verification service provider 160.

In response to receiving the transaction request, the method includes transmitting a request for encoded or encrypted facial image data of the purchaser and an encoding indicator to the client device (5-2). In some implementations, the encoding indicator provides a set of instructions or selection to the client device that indicates which portions of the facial image data to encode and transmit. For example, with further reference to FIG. 2, the verification server may request a combination of facial features selected in a pseudo-random fashion to be encoded together (e.g. an image of the eyes A and mouth B, or the whole face F, or just the nose). Additionally and/or alternatively, the encoding indicator also signals what type and level of encoding or encryption to use on the facial image data. In some implementations, the type and level of encoding or encryption includes an irreversible compression of the selected portions of facial image data, which results in a unique or near unique image data value that can be transmitted to the verification server for comparison with a corresponding server generated value. Additionally and/or alternatively, the encoding indicator includes a pseudo-randomly generated component for each online transaction, such as a pseudo-randomly generated number or the like, which may be included in the encoding process to further enhance security of the transaction.

Subsequently, the method includes receiving the encoded/encrypted image data (5-3). As an optional measure, the method includes determining if the timestamp of the received encoded image data is valid (5-4). In other words, the method includes inspecting the data field included in the received encoded image file to determine whether or not the image was taken within a time period proximate to the current process (e.g. 1-2 minutes). If the timestamp is not valid ("No" path from 5-4), the method includes taking remedial action or stopping the process altogether (5-5). For example, in some implementations a remedial action includes at least one requesting another image at least one more time. Additionally and/or alternatively, the first rejected image and any subsequent images may be compared to determine if there are any abnormalities or other signs of fraud on the process. Additionally and/or alternatively, in some implementations a remedial action includes connecting the user with a call center representative.

On the other hand, if the timestamp is valid ("Yes" path from 5-4), the method includes generating verification image value from a stored image associated with the true authorized user according to the encoding indicator transmitted to the client device (5-6). In other words, server generated verification image value includes user-specific authentication data that is created on the on-the-fly during each online transaction process through the generation and use of pseudo-random encoding indicators.

Subsequently, the method includes comparing the received encoded image data to the server generated verification image value in order to determine if the two values match (5-7). In some implementations, the matching process is not fault-tolerant, and precise matching is preferred. If the received encoded image data and the server generated verification image value do not match ("No" path from 5-7), the method includes taking remedial action or stopping the process altogether (5-8).

On the other hand, if the received encoded image data and the server generated verification image value match one another ("Yes" path from 5-7), the method optionally includes checking the location data associated with the received encoded image data (5-9), before authorizing the transaction. For example, location data can be determined by inspecting IP addresses, routing information received along with a set-up request, or even coordinated embedded in an image when it was captured by a smartphone.

If the location data is suspect ("Yes" path from 5-9), the method includes taking remedial action or stopping the process altogether (5-11). For example, if the location data indicates that the purchase is being attempted in a geographic location that the true authorized user has not made a purchase from in the past or is unlikely to be in based on recent transactions the current transaction would be denied. On the other hand, if the location data is not suspect ("No" path from 5-9), the method includes providing an indication that the transaction is authorized (5-10). For example, with reference to FIG. 1, one of the verification servers 151 or 161 transmits a verification indicator to the online sales application server 141.

Figure 6:
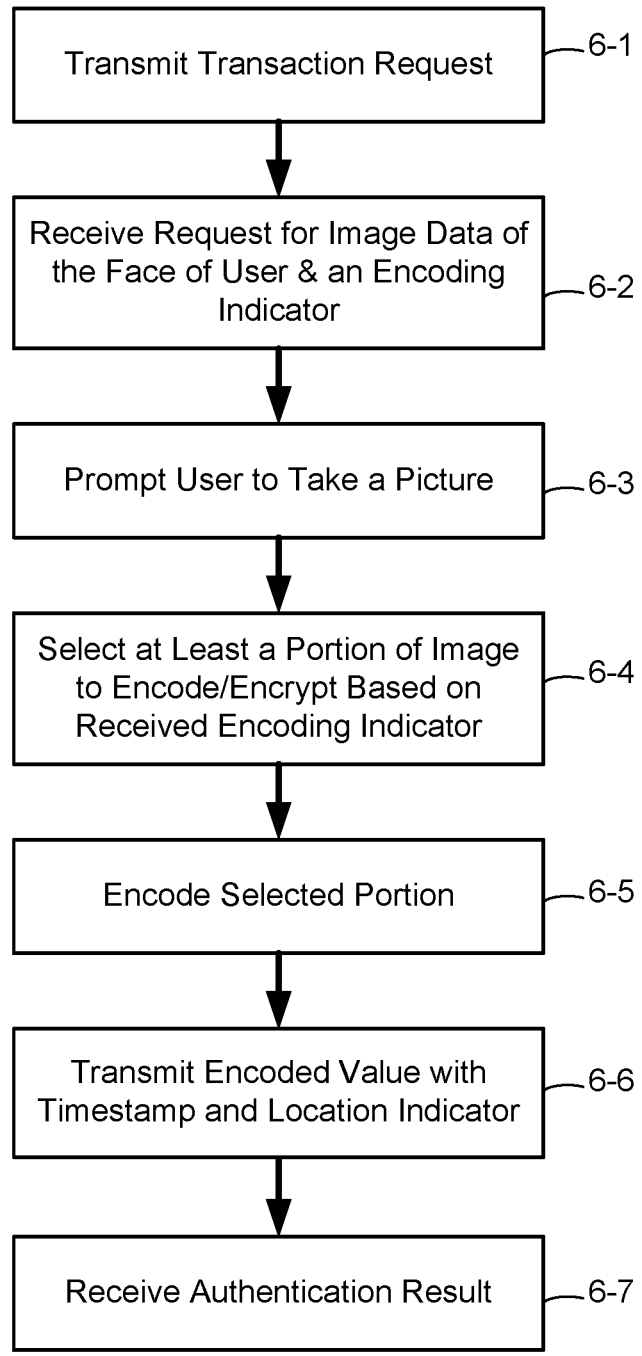
FIG. 6 is a flowchart representation of a client device method.

FIG. 6 is a flowchart representation of a client device method. In some implementations, the method is performed by a client device (e.g. smart-phone, tablet, laptop, personal computer, etc.) in order to facilitate authentication of an online financial transaction. For example, with reference to FIG. 1, the method may be implemented on at least one of the two client devices 102 and 103 as a part of an online commerce client application. To that end, the method includes transmitting a transaction request (6-1). In other words, the user has selected a product or service using the client device, and has proceeded to tender payment using a payment instrument such as a credit card or debit card. Subsequently, the method includes receiving a request for encoded or encrypted facial image data of the purchaser and an encoding indicator (6-2). As noted above, in implementations, the encoding indicator provides a set of instructions or selection to the client device that indicates which portions of the facial image data to encode and transmit. For example, with further reference to FIG. 2, the verification server may request a combination of facial features selected in a pseudo-random fashion to be encoded together (e.g. an image of the eyes A and mouth B, or the whole face F, or just the nose). Additionally and/or alternatively, the encoding indicator also signals what type and level of encoding or encryption to use on the facial image data. In some implementations, the type and level of encoding or encryption includes an irreversible compression of the selected portions of facial image data, which results in a unique or near unique image data value that can be transmitted to the verification server for comparison with a corresponding server generated value. Additionally and/or alternatively, the encoding indicator includes a pseudo-randomly generated component for each online transaction, such as a pseudo-randomly generated number or the like, which may be included in the encoding process to further enhance security of the transaction.

The method includes prompting the user to take one or more pictures using a camera associated with the client device (6-3). For example, a picture is taken with an integrated camera included in a smartphone or a digital camera peripheral device connectable to a desktop computer or laptop, such as a web-cam. If multiple pictures are taken, the picture with the best image quality is preferably selected. In some implementations, images are analyzed and ranked based on characteristics such as focus quality, noise, brightness, tint, etc. The image with a preferred rank may be considered the best image for a particular set of analysis rules. The method includes selecting at least a portion of the image to encode or encrypt based on the received encoding indicator (6-4), and then encoding the selected portion(s) (6-5). The method includes transmitting the encoded value with the timestamp of the image and optionally a location indicator (other than merely an IP address) to the verification server (6-6). And to complete the transaction, the method includes receiving an authentication result (6-7), which may in some implementations include an indication that the transaction was completed successfully.

In addition to capturing and verifying facial images of online consumers, as noted above, it would be desirable for online merchants and/or service providers of age restricted products to be able to reliably check the age of users and/or potential consumers. For example, an online gambling website (or the website selling and/or advertising alcohol and/or tobacco products) may attempt age verification in order to ensure that the users and/or consumers are of age. However, prior to the various implementations described herein, online merchants and/or service providers offering age-restricted products and/or services were unable to reliably verify that a user has provided his/her actual birth date or other personal data.

By contrast, additionally and/or alternatively to the systems, methods, and devices described thus far, some features of various implementations enable processes for checking the authenticity of payment instruments and/or identification documents (e.g. driver licenses, health cards, passports, or the like) in order to provide verification of a user's age and/or person. In some implementations, methods of checking the authenticity of payment instruments and/or identification documents include receiving one or more images of a payment instrument and/or identification document, analyzing the image to identify one or more characteristics of the payment instrument and/or identification document, and comparing the one or more identified characteristics against known verified characteristics to determine an indicator of authenticity of the payment instrument and/or identification. In some implementations, an indicator of authenticity may include a rank based at least on a number of matching rules for a particular implementation.

Figure 7:
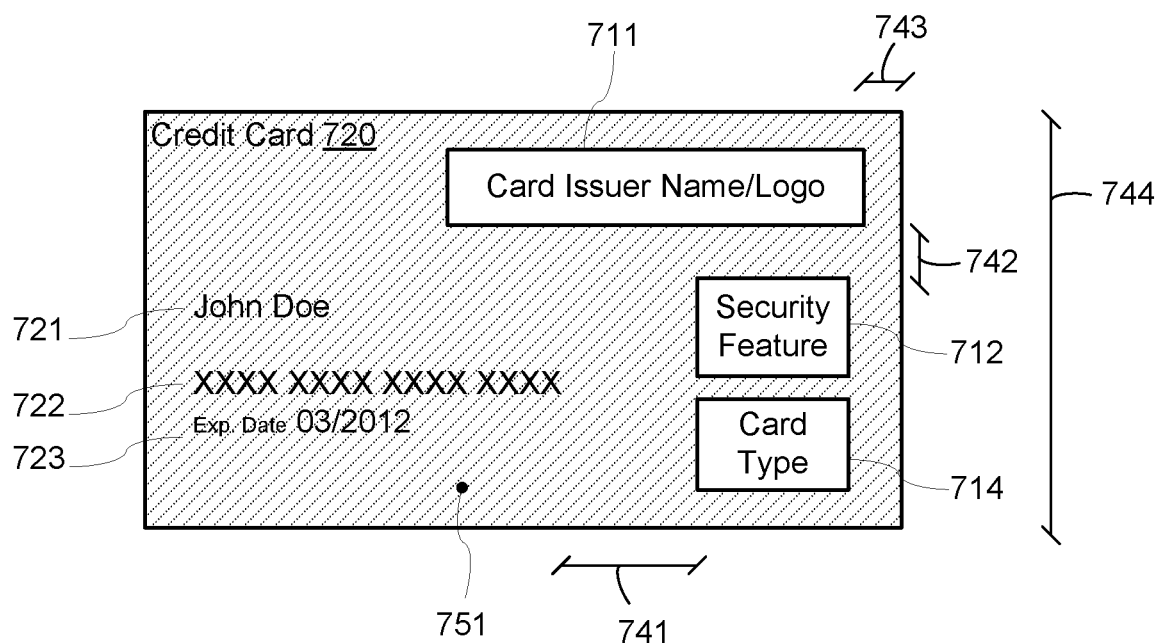
FIG. 7 is a schematic drawing of an example credit card.

FIG. 7 is a schematic drawing of an example credit card 720 provided to describe the various characteristics that may be identified from an image of a credit card. As is typical of a credit card, the credit card 720 may include a cardholder name 721 (i.e. the true authorized user of the card), a credit card number 722, an expiry date 723, a card issuer name or logo 711 (e.g. Bank of Somewhere), one or more security features 712 (e.g. a hologram), a logo for the card type 714 (e.g. VISA or MasterCard), and a background color and/or pattern 751. Additionally, the credit card may also include a Card Verification Value Code (CVV or CVC), which is typically printed or engraved one either the front or back surface of the card. Additionally, these features are typically arranged in a very precise way and have other precise characteristics associated with them, which can be checked to ensure that the credit card 720 is authentic.

For example, with respect to the cardholder name 721, the credit card number 722, the expiry date, the card issuer name/log 711, characteristics such as font size, spacing, color and the like may be measured and compared against the card issuer's verified specifications in order to determine differences or matches. Similarly, card measurements, such as the offset 743 of the card issuer name/logo 711 from the edge of the card, the spacing 742 between the card issuer name/logo 711, the spacing 741 between the credit card number 722 and the security feature 712, and the height 744 of the credit card may be measured from an image of the credit card 720, and compared against the card issuer's verified specifications in order to determine differences or matches. Additionally and/or alternatively, the background 751 may include a distinctive color, a pattern, a watermark, a translucent security feature, etc., which may be evaluated to determine differences or matches as a part of the verification process.

Moreover, the aforementioned characteristics discussed are merely examples of some of the many characteristics that may be measured from images of a credit card (or other payment instrument or identification document). As such, those skilled in the art will appreciate from the present disclosure that numerous other characteristics may be considered and used for verification purposes.

Figure 8:
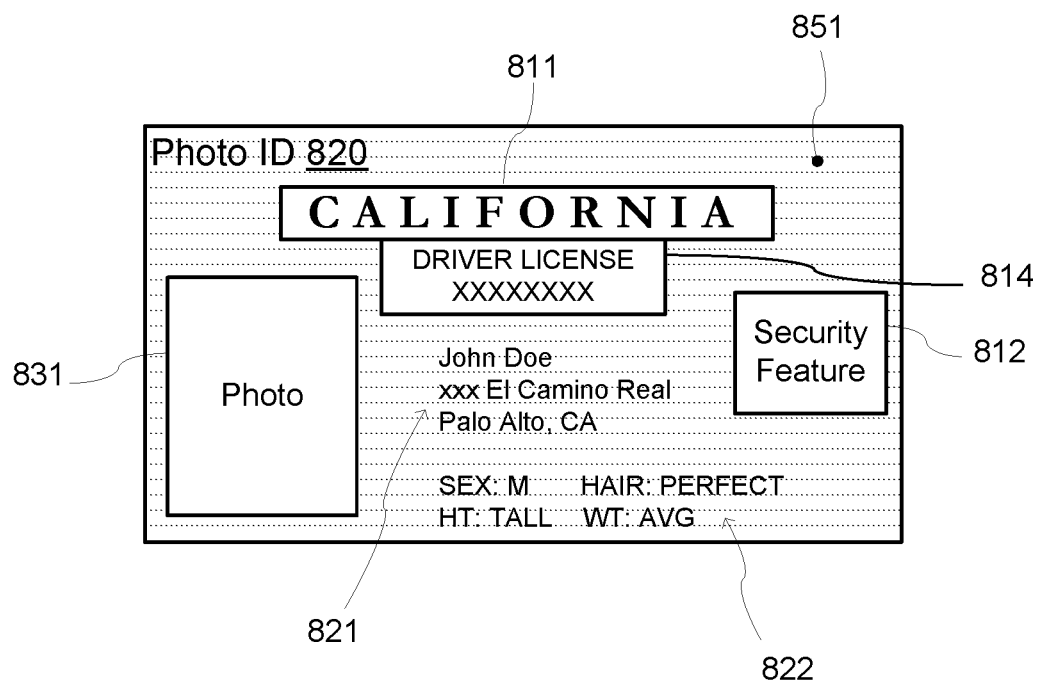
FIG. 8 is a schematic drawing of an example identification document/card.

FIG. 8 is a schematic drawing of an example driver license 820 (i.e. an identification card or document). Similar to the schematic of the credit card 720 of FIG. 7, the driver license 820 includes a number of characteristic features that are typical of a driver license or the like. For example, the driver license 820 includes a photo 831, an indicator of the jurisdiction 811, an indicator of the license 814, a security feature 812 (e.g. hologram or semi-transparent picture, etc.), first and second license holder information fields 821, 822, and a background color and/or pattern 851. As described above with reference to FIG. 7, each of these features, individually and/or in combination, may be evaluated from an image of the driver license 820 (or other identification document) sent from a client device to a verification server.

Figure 9:
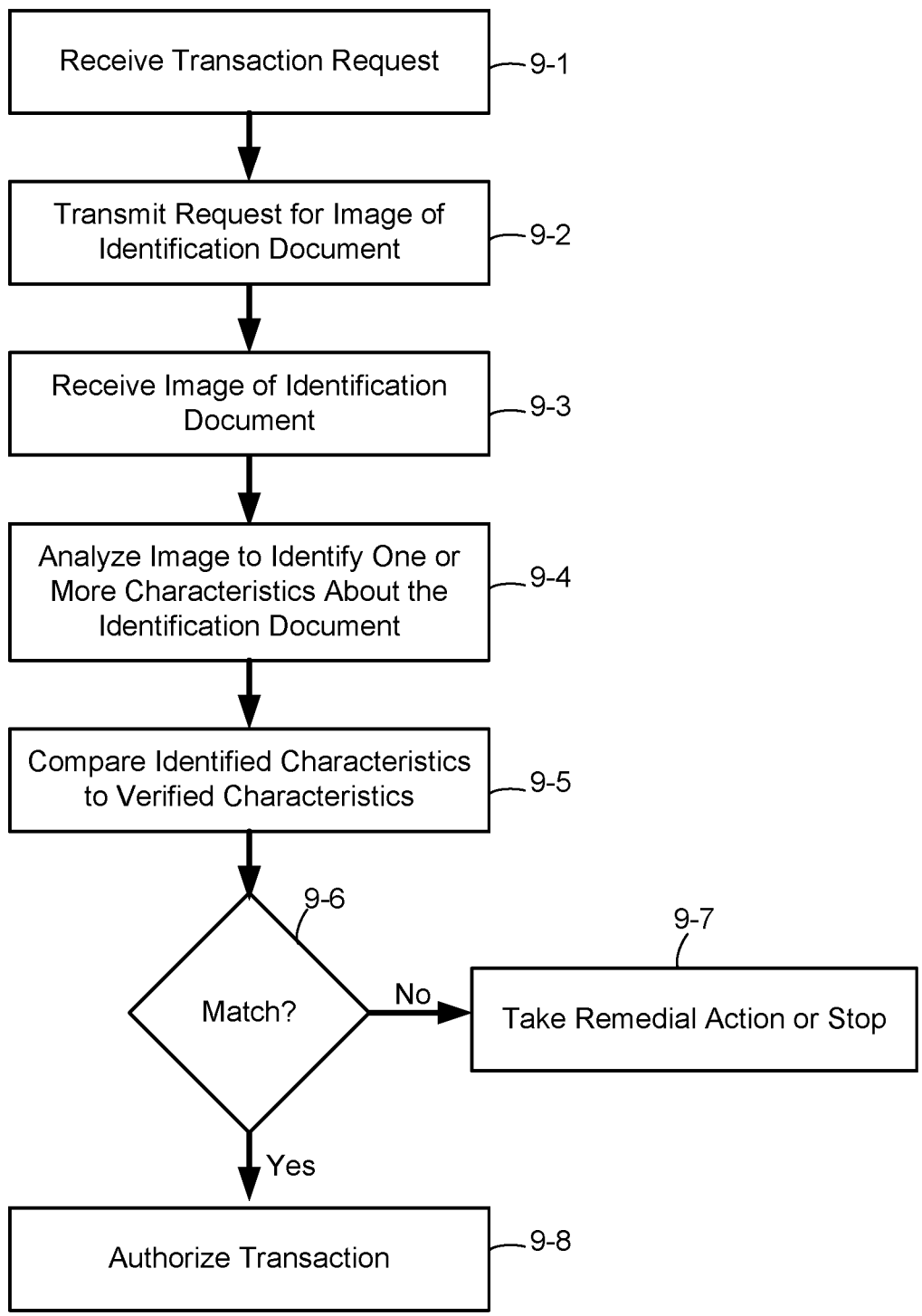
FIG. 9 is a flowchart representation of a server system method.

FIG. 9 is a flowchart representation of a server system method. In some implementations, the method is performed by a verification server system in order to enable age-verification during an online transaction or service offering. For example, with reference to FIG. 1, the method may be implemented on the verification servers 151 and/or 161 as a verification server software application or on a verification server (not shown) operated by the retailer or service provider 140. In some implementations, it is preferable to perform the method using a secure sockets layer supporting encrypted communications of a data-link. To that end, as represented by block 9-1, the method includes receiving a transaction request. For example, a transaction request may include a request to view and purchase age-restricted products and associated content (e.g. alcohol and tobacco products), a request to view age-restricted material, a request to participate in an age-restricted activity (e.g. online gaming), etc. In response, as represented by block 9-2, the method includes transmitting a request for an image of an identification document, such as a driver license, a health card, a passport photo page, or other identification card. As represented by block 9-3, the method includes receiving the image of the identification document.

As represented by block 9-4, the method includes analyzing the image to identify one or more characteristics about the identification document. For example, as noted above with reference to FIGS. 7 and 8, characteristics such as, font, font color, font spacing, feature spacing, feature organization, patterns, colors, security features, watermarks and the like may be identified and compared against verified characteristics. In turn, as represented by block 9-5, the method includes comparing one or more of the identified characteristics against verified characteristics. For example, as noted above with further reference to FIG. 1, verified identification document characteristics 335 may be stored in the user information database 303, along with other user information.

As represented by block 9-6, the method includes determining whether the one or more identified characteristics match one or more of the verified characteristics. In some implementations, precise matching is preferred, and as such, each of the one or more identified characteristics must match a corresponding verified characteristic to confirm a match. In some implementations, fault tolerant matching is permissible. In other words, some mismatches between the one or more identified characteristics and corresponding verified characteristics are allowed. In some fault tolerant implementations, security may be enhanced by confirming a match at least in response to determining that a majority of the one or more identified characteristics match corresponding verified characteristics. In some fault tolerant implementations, security may be enhanced by confirming a match at least in response to determining that a particular subset of the one or more identified characteristics precisely match corresponding verified characteristics.

If the one or more identified characteristics do not satisfy the particular implemented matching rule(s) ("No" path from block 9-6), as represented by block 9-7 the method includes taking remedial action or denying the transaction. In some implementations, remedial action may include at least one of re-sending the original authentication request, sending a different authentication that includes a request for different or related authentication information, sending a message that indicates that the user should call a call-center representative, and automatically connecting the user with a call-center representative. Additionally and/or alternatively, the process may stop in response to determining that the authentication information is not valid because the user has provided invalid authentication data more than a threshold number of times. Additionally and/or alternatively, the process may stop in response to determining that the authentication information is not valid because the current user is accessing the verification server from a device that is located in a geographic location that actual user is unlikely to be. For example, location data can be determined by inspecting IP addresses or routing information received along with the set-up request, or even embedded in an image when it was captured by a smartphone.

On the other hand, if the one or more identified characteristics satisfy the particular implemented matching rule(s) ("Yes" path from block 9-6), as represented by block 9-8, the method includes authorizing the transaction. For example, with reference to FIG. 1, one of the verification servers 151 or 161 transmits a verification indicator to the online sales application server 141.

Figure 10:
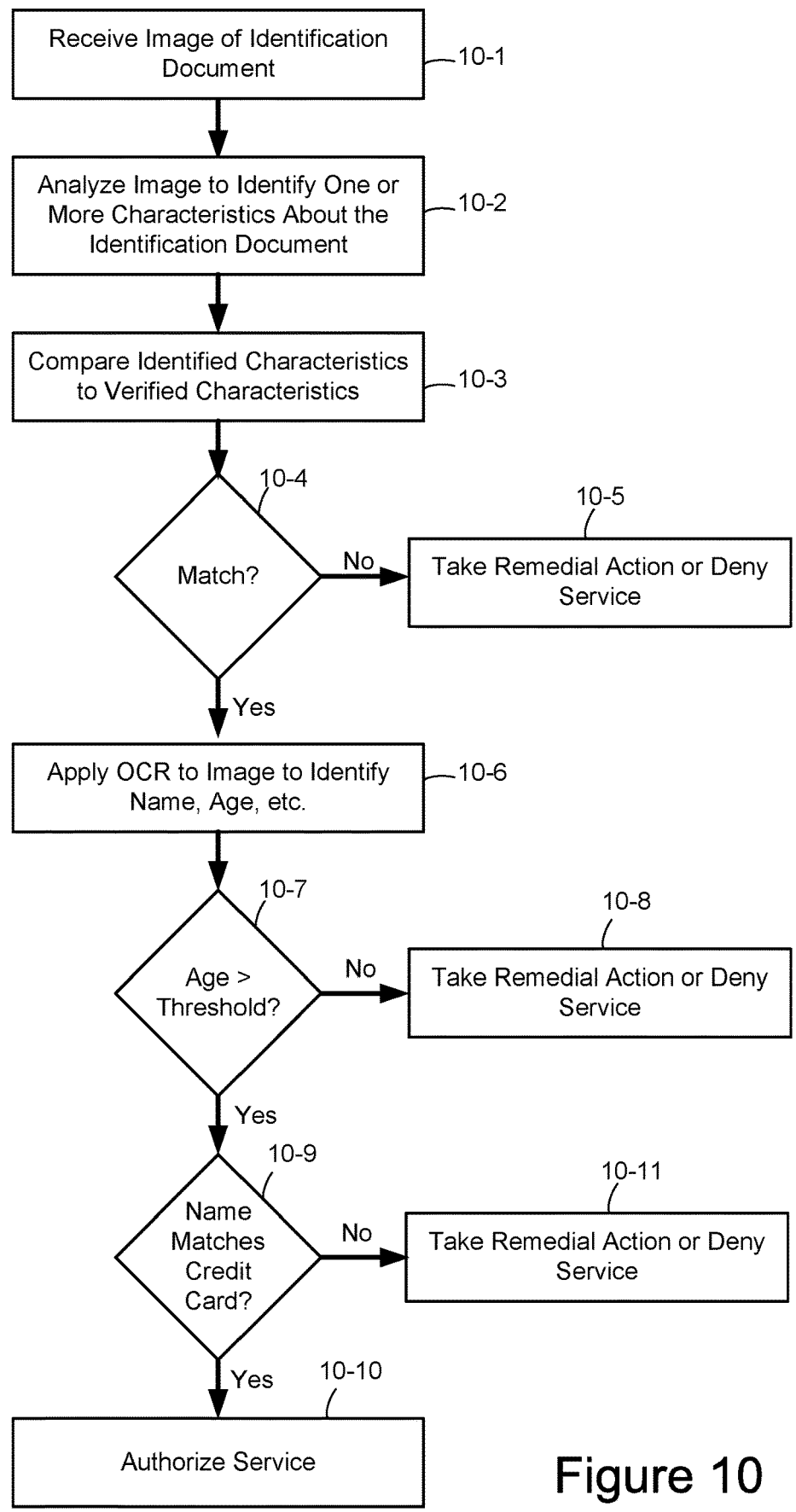
FIG. 10 is a flowchart representation of another server system method.

FIG. 10 is a flowchart representation of another server system method. In some implementations, the method is performed by a verification server system in order to enable age and/or identity verification during an online transaction or service offering. For example, with reference to FIG. 1, the method may be implemented on the verification servers 151 and/or 161 as a verification server software application or on a verification server (not shown) operated by the retailer or service provider 140.

To that end, as represented by block 10-1, the method includes receiving an image of the identification document provided to access an age (or identity) restricted service (or purchase an age-restricted product). As represented by block 10-2, the method includes analyzing the image to identify one or more characteristics about the identification document. For example, as noted above with reference to FIGS. 7 and 8, characteristics such as, font, font color, font spacing, feature spacing, feature organization, patterns, colors, security features, watermarks and the like may be identified and compared against verified features. In turn, as represented by block 10-3, the method includes comparing one or more of the identified characteristics against verified characteristics. For example, as noted above with further reference to FIG. 1, verified identification document characteristics 335 may be stored in the user information database 303, along with other user information.

As represented by block 10-4, the method includes determining whether the one or more identified characteristics match one or more of the verified characteristics, as described above with respect to FIG. 9. In some implementations, precise matching is preferred, and as such, each of the one or more identified characteristics must match a corresponding verified characteristic to confirm a match. In some implementations, fault tolerant matching is permissible. In other words, some mismatches between the one or more identified characteristics and corresponding verified characteristics are allowed. In some fault tolerant implementations, security may be enhanced by confirming a match at least in response to determining that a majority of the one or more identified characteristics match corresponding verified characteristics. In some fault tolerant implementations, security may be enhanced by confirming a match at least in response to determining that a particular subset of the one or more identified characteristics precisely match corresponding verified characteristics.

If the one or more identified characteristics do not satisfy the particular implemented matching rule(s) ("No" path from block 10-4), as represented by block 10-5, the method includes taking remedial action or denying the transaction, as described above with respect to FIG. 9. On the other hand, if the one or more identified characteristics satisfy the particular implemented matching rule(s) ("Yes" path from block 10-4), as represented by block 10-6 the method may include applying an optical character recognition technique to the received image of the identification document in order to identify and extract identity information, such as name and age, etc.

As represented by block 10-7, the method further includes determining from the extracted identity information whether the age data is greater than a particular threshold. For example, in some implementations, the method includes determining whether the age data included on the identification document indicate that the purported user is old enough to access an online gambling website in a particular jurisdiction.

If the age data is less than the threshold ("No" path from block 10-7), as represented by block 10-8, the method includes taking remedial action or denying the transaction, as described above with respect to FIG. 9. On the other hand, if the age data is greater than the threshold ("Yes" path from block 10-7), as represented by block 10-9, the method includes determining whether the name extracted from the identification document matches the name on a credit card image.

If the name extracted from the identification document does not match the name on a credit card image ("No" path from block 10-9), as represented by block 10-11, the method includes taking remedial action or denying the transaction, as described above with respect to FIG. 9. On the other hand, if the name extracted from the identification document matches the name on a credit card image ("Yes" path from block 10-9), as represented by block 10-10, the method includes authorizing the transaction or service. For example, with reference to FIG. 1, one of the verification servers 151 or 161 transmits a verification indicator to the online sales application server 141.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A computer-implemented method of identifying a user, the method comprising:
   at a server system having one or more processors and memory storing programs for execution by the one or more processors:
      receiving from a remote server a request to identify a first user;
      in response to receiving an identification request, sending to a client device of the first user a request for encoded image data corresponding to one or more facial features of the first user, wherein:
         a respective facial feature of the one or more facial features is a portion, less than all, of a full face, and
         the request specifies a particular encoding for the image data;
      responsive to the request for the encoded image data, receiving encoded image data from the client device, the received encoded image data corresponding to the one or more facial features of the first user;
      obtaining stored image data for an authorized user, the stored image data corresponding to one or more facial features of the authorized user;
      determining whether the first user is the authorized user based on a comparison of the received encoded image data and the stored image data; and
      providing to the remote server an identification indicator based on the determination of whether the first user is the authorized user.

2. The method of claim 1, wherein the identification indicator indicates that the first user is the authorized user.

3. The method of claim 1, wherein the identification indicator indicates that the first user is not the authorized user, and the method further comprises initiating a remedial process in response to determining that the first user is not the authorized user.

4. The method of claim 3, wherein the remedial process includes one or more of:
   sending to the client device a request for second encoded image data;
   sending to the client device a request for encoded audio data; and
   sending a notification to the client device indicating that the first user was not identified.

5. The method of claim 1, wherein the one or more facial features of the first user comprise a plurality of facial features of the first user and the particular encoding for the plurality of facial features encodes the plurality of facial features in combination with one another.

6. The method of claim 1, wherein the particular encoding for the image data comprises an irreversible compression of the image data.

7. The method of claim 1, wherein the particular encoding for the image data comprises a pseudo-random encoding selected in response to the identification request.

8. The method of claim 1, wherein the encoded image data from the client device includes a timestamp, and the method further comprises:
   determining based on the timestamp whether the image data was taken within a preset time period; and
   wherein the identification indicator is further based on the determination of whether the image data was taken within the preset time period.

9. The method of claim 1, further comprising:
   in response to receiving the identification request, requesting from the client device a current geographical location of the client device;
   responsive to the request for location data, receiving geographical location data from the client device;
   determining based on the geographical location data whether the client device is in an unexpected location; and wherein the identification indicator is further based on the determination of whether the client device is in an unexpected location.

10. The method of claim 1, further comprising:
in response to receiving the identification request, requesting from the client device encoded audio data corresponding to the first user speaking one or more words;
responsive to the request for encoded audio data, receiving encoded audio data from the client device; and
wherein determining whether the first user is the authorized user is further based on the encoded audio data.

11. An identification server system, comprising:
one or more processors; and
memory coupled to the one or more processors, the memory storing one or more programs configured to be executed by the one or more processors, the one or more programs including instructions for:
receiving from a remote server a request to identify a first user;
in response to receiving an identification request, sending to a client device of the first user a request for encoded image data corresponding to one or more facial features of the first user, wherein:
a respective facial feature of the one or more facial features is a portion, less than all, of a full face, and
the request specifies a particular encoding for the image data;
responsive to the request for the encoded image data, receiving encoded image data from the client device, the received encoded image data corresponding to the one or more facial features of the first user;
obtaining stored image data for an authorized user, the stored image data corresponding to one or more facial features of the authorized user;
determining whether the first user is the authorized user based on a comparison of the received encoded image data and the stored image data; and
providing to the remote server an identification indicator based on the determination of whether the first user is the authorized user.

12. The identification server system of claim 11, wherein the one or more facial features of the first user comprise a plurality of facial features of the first user and the particular encoding for the plurality of facial features encodes the plurality of facial features in combination with one another.

13. The identification server system of claim 11, wherein the particular encoding for the image data comprises an irreversible compression of the image data.

14. The identification server system of claim 11, wherein the particular encoding for the image data comprises a pseudo-random encoding selected in response to the identification request.

15. The identification server system of claim 11, wherein the encoded image data from the client device includes a timestamp, and wherein the one or more programs further include instructions for:

determining based on the timestamp whether the image data was taken within a preset time period; and
wherein the identification indicator is further based on the determination of whether the image data was taken within the preset time period.

16. The identification server system of claim 11, wherein the one or more programs further include instructions for:
in response to receiving the identification request, requesting from the client device a current geographical location of the client device;
responsive to the request for location data, receiving geographical location data from the client device;
determining based on the geographical location data whether the client device is in an unexpected location; and
wherein the identification indicator is further based on the determination of whether the client device is in an unexpected location.

17. The identification server system of claim 11, wherein the one or more programs further include instructions for:
in response to receiving the identification request, requesting from the client device encoded audio data corresponding to the first user speaking one or more words;
responsive to the request for encoded audio data, receiving encoded audio data from the client device; and
wherein determining whether the first user is the authorized user is further based on the encoded audio data.

18. A non-transitory computer-readable storage medium storing one or more programs, the one or more programs comprising instructions, which when executed by a server system, cause the server system to:
receive from a remote server a request to identify a first user;
in response to receiving an identification request, send to a client device of the first user a request for encoded image data corresponding to one or more facial features of the first user, wherein:
a respective facial feature of the one or more facial features is a portion, less than all, of a full face, and
the request specifies a particular encoding for the image data;
responsive to the request for the encoded image data, receive encoded image data from the client device, the received encoded image data corresponding to the one or more facial features of the first user;
obtain stored image data for an authorized user, the stored image data corresponding to one or more facial features of the authorized user;
determine whether the first user is the authorized user based on a comparison of the received encoded image data and the stored image data; and
provide to the remote server an identification indicator based on the determination of whether the first user is the authorized user.

* * * * *